United States Patent [19]

Grimberg

[11] Patent Number: 4,919,384
[45] Date of Patent: Apr. 24, 1990

[54] GUIDING DEVICE FOR A PORTABLE MACHINE

[76] Inventor: Gerard Grimberg, 28 Rue De Garches, 92210 Saint Cloud, France

[21] Appl. No.: 302,812

[22] Filed: Jan. 27, 1989

[51] Int. Cl.$^5$ ................................................ B27B 9/04
[52] U.S. Cl. ...................................... 248/646; 248/657; 83/745; 269/1; 30/372
[58] Field of Search .................. 248/646, 657; 83/745; 269/1; 30/372

[56] References Cited

U.S. PATENT DOCUMENTS

| | | | |
|---|---|---|---|
| 4,291,602 | 9/1981 | Fast et al. ............................... | 83/745 |
| 4,381,103 | 4/1983 | Ferdinand et al. ................ | 83/745 X |
| 4,566,188 | 1/1986 | Wilson ............................... | 83/745 X |

*Primary Examiner*—Alvin C. Chin-Shue
*Attorney, Agent, or Firm*—Ostrolenk, Faber, Gerb & Soffen

[57] ABSTRACT

A device for supporting and guiding portable electric machines performing a rectilinear work, such as a cut, a rabbet or bead, which includes a rectilinear rail (1) of a U-shaped section including two parallel wings (2) and a bottom (3) in which a travelling path (5) receives a mobile carrier (6) adapted for carrying the machine, the rail being fixed to the material (23) to be worked by sliding stirrups (8, 24); the rail is made at least on a major portion of its perimeter of a double U-shaped wall, the two walls being rigidly connected to one another by braces placed in the space between the two walls so as to form a monolithic structure, non deformable under the efforts generated by the machine in any position.

9 Claims, 8 Drawing Sheets

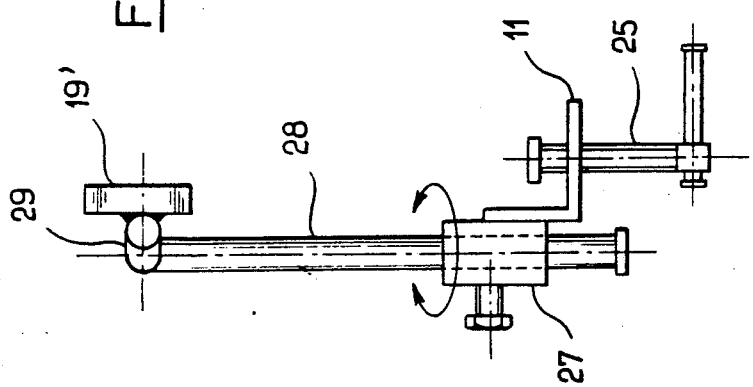
FIG._3C
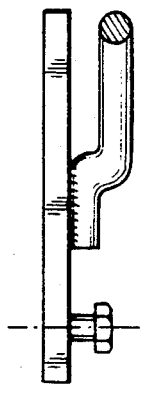
FIG._3A
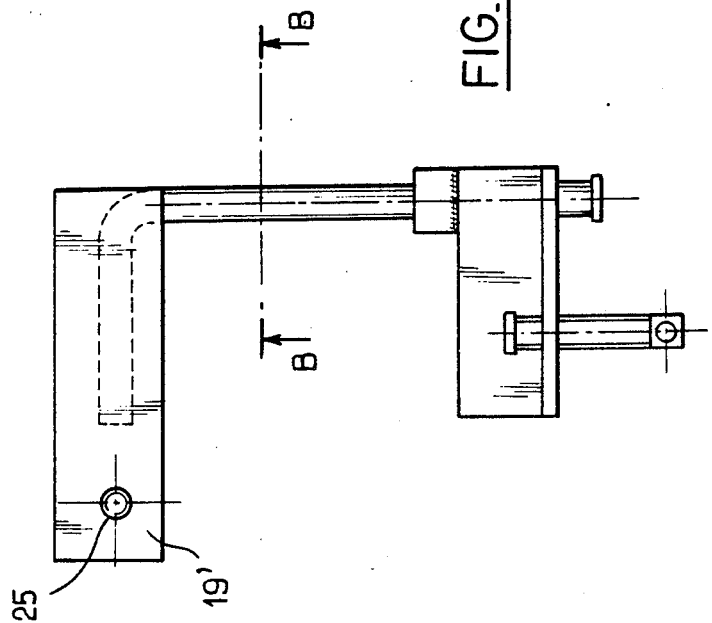
FIG._3B

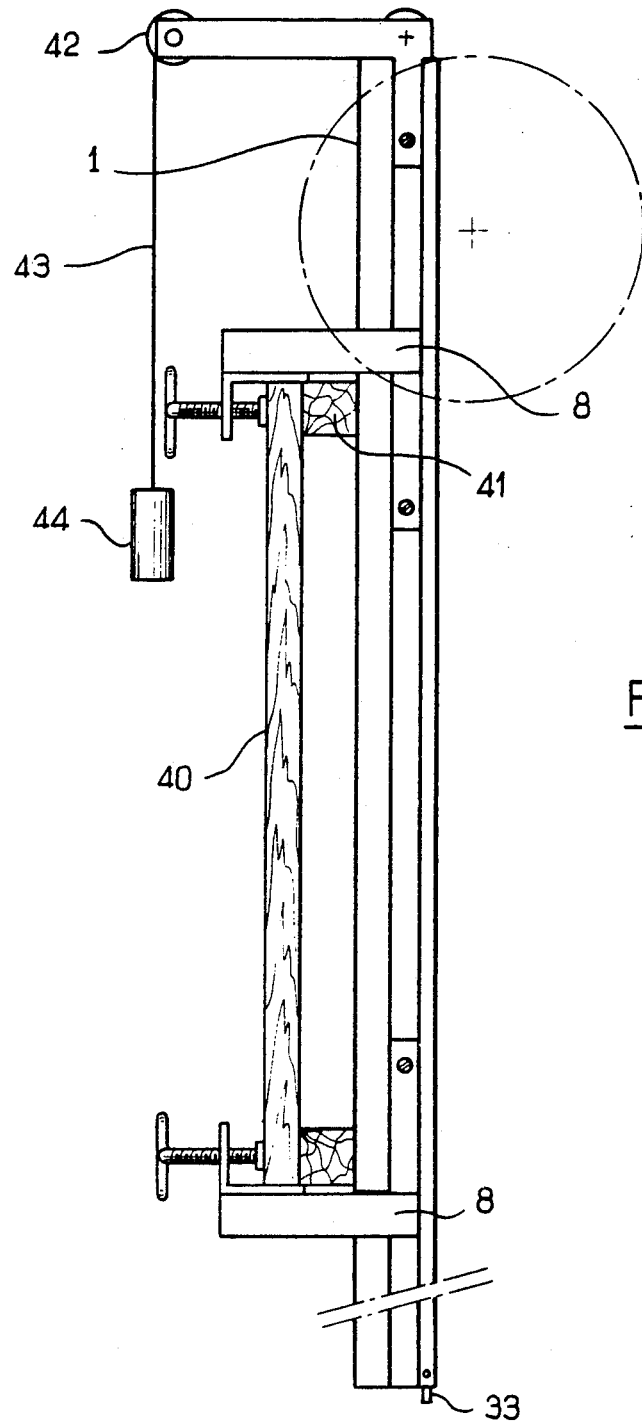
FIG_4

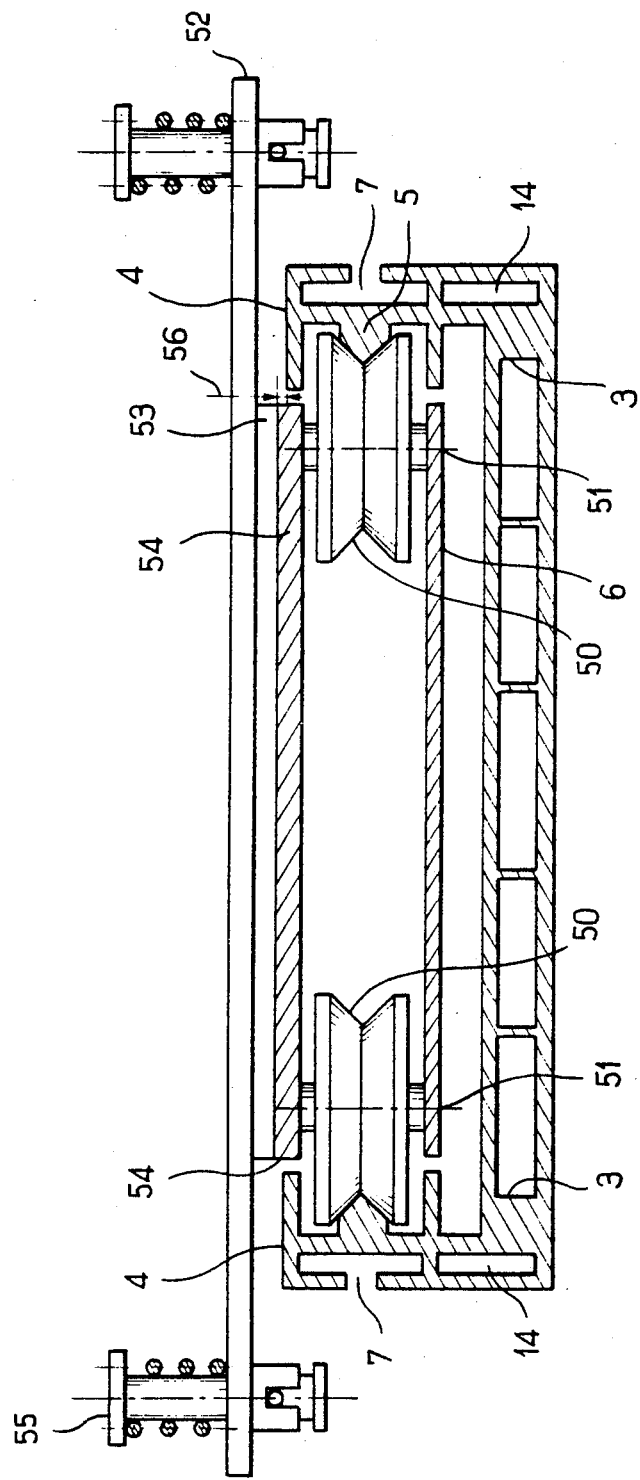

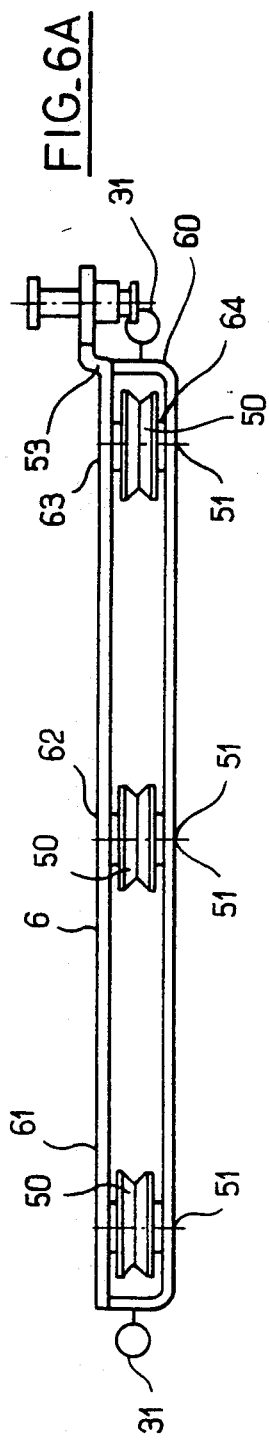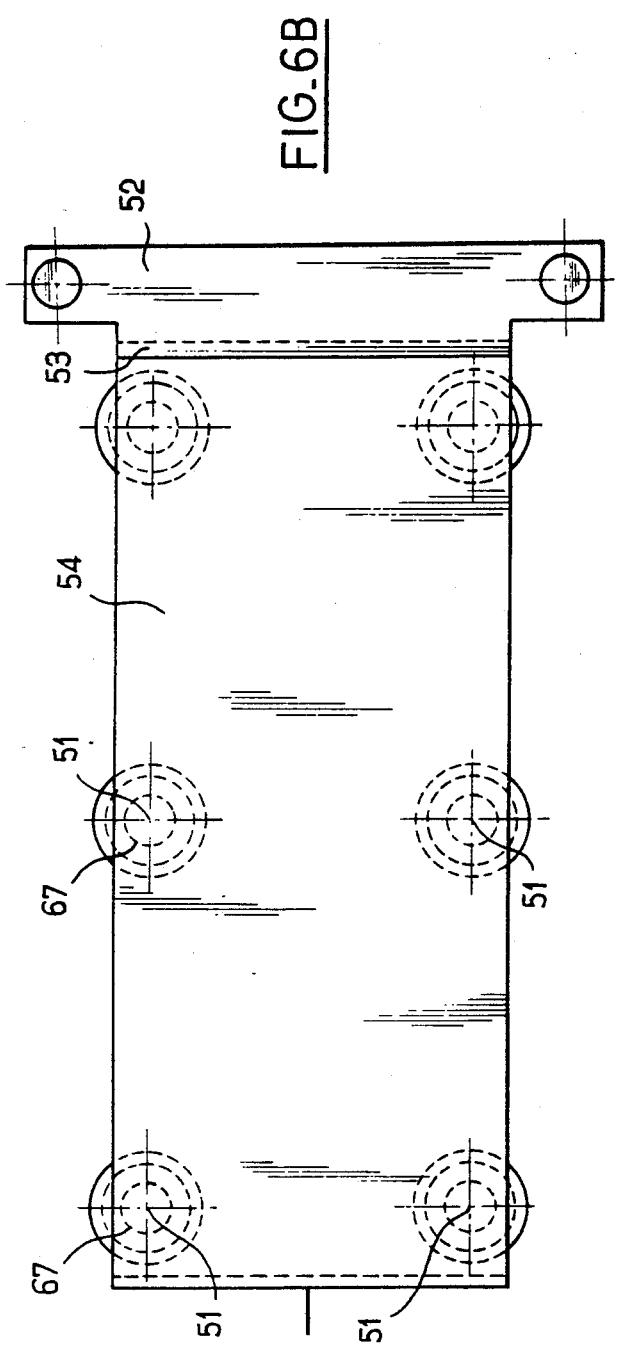

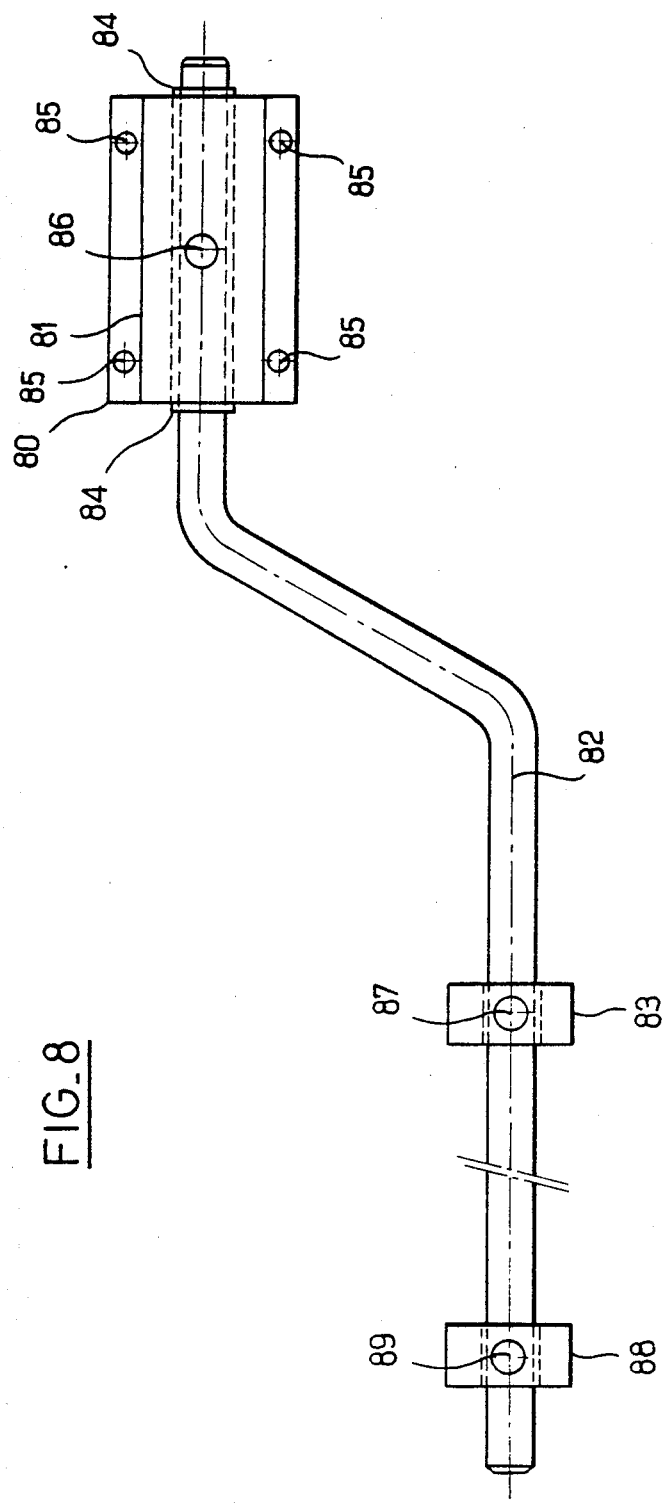
FIG_8

GUIDING DEVICE FOR A PORTABLE MACHINE

FIELD OF THE INVENTION

The present invention relates to a device usable for supporting and guiding a portable electric machine which has to be displaced along a straight line for effecting its work, for example a cut, a rabbet or a bead, the device being fixed directly on a plate material to be worked, for example wood, asbestos cement, gypsum plaster boards.

BACKGROUND OF THE INVENTION

In this field, guiding devices for pannel saws are known, but these devices allow only cuts at right angles, they have large dimensions and are therefore costly, difficult to transport and not easily adaptable to various works.

The use of a guiding rule maintained on the plate material by clamps, or of a support with a rod adaptable to the edge of the plate, is also known, but these devices do not allow working in the middle of a plate of large size, or on plates the edges of which are not rectilinear, and the orientation of the machine is limited to a work on a flat surface. Moreover, these devices can impede the operator and are therefore the cause of possible wounds, and the scraps generated by the work executed can deposit on the guiding element and impair the precision and ease of operation.

OBJECTS AND SUMMARY OF THE INVENTION

The object of the invention is to avoid in a new manner the various above disadvantages of the known devices.

Therefore, the object of the invention is a guiding device for a portable electric machine working rectilinearly, which can be fixed in any orientation in three dimensions on a plate material to be worked and which allows effecting an accurately guided work in any such position.

An object of the invention is also a device of the hereabove type which is light in weight, has small space requirements, is easy to transport, mount, use and dismount, without protruding portions which could create a risk for the operator or interfere with the machine movements.

Another object of the invention is a device of the hereabove type having a length which can be easily adapted to the dimensions of the material, by an end-to-end assembly of elementary guiding members.

The invention has also an object a guiding device of the hereabove type allowing the machine to follow the surface of the material, even when not plane, so as to carry out a rectilinear work of constant depth with respect to this surface.

The invention provides also a device of the hereabove type having the guiding portions protected as regards the material scraps.

According to the invention, these objects are reached by a device including a rectilinear rail of a U-shaped section, inside which rolls a tool-holder carrier, whereby the rail can be fixed by clamping stirrups to a plate material on which the tool has to work, this device being characterized in that the rail is constituted, at least over a major portion of its section, of a double U-shaped wall, the two walls being rigidly connected to one another by braces or walls placed in the space between the two walls.

According to another feature of the invention, one at least of said braces extends inside the double-walled wings of the U-shaped profile in the longitudinal direction of the rail, so as to define in this inner space on the one hand a slide, formed with a slot opened in its outer wall, for the longitudinally settable mounting of the stirrups and setting or manoeuvre accessories of the machine, and on the other hand housings for prolongators or spindles for the end-to-end assembly of successive rails, said spindles being preferably four in number at each rail junction.

Still according to another feature of the invention, the wings with a U-shaped profile include each, at their end, a flange oriented toward the inside of the profile and extending up to the immediate vicinity of the carrier, parallel to the base of the U.

According to another aspect of the invention, the travelling paths of the carrier are of a triangular section and are fixed inside the U-shaped profiled wings, and the rollers, the groove of which has a corresponding profile, rotate on axes parallel to the wings and are directly screwed, at their ends provided respectively with right-hand and left-hand threads, in two parallel plates constituting the carrier body.

Another feature of the device according to the invention is that the carrier has a T-shaped configuration, the T leg being formed by the carrier body housed inside the rail, and the transverse bar of the T being in a plane parallel to the body but slightly offset above the rail, the transverse bar extending laterally beyond the rail wings in order to carry accessories such as stroke-defining abutments, which have to be freely displaceable along the rail.

Still according to another aspect of the invention, the rail fixation stirrups include a base which can slide in the aforementioned slide of the rail wing, an outer rod, rigidly connected to said base and perpendicular to the bearing face of the rail, a sleeve which can be set angularly on said rod, and a clamping screw for the material carried by a square rigid with said sleeve.

According to another aspect of the invention, two identical cylindrical rods, parallel to the material and perpendicular to the rail, are fixed at one end on the carrier so that they can rotate freely, but without any possibility of an axial displacement; they are connected at their other end in the same way to the machine, and they include in their intermediate portion a double bayonnet-type elbow whose angular change of position allows compensating the relative variations between the machine and rail surfaces in contact with the material.

BRIEF DESCRIPTION OF DRAWINGS

Other objects and advantages of the invention will become more apparent to those skilled in the art, from the hereafter description of a preferred embodiment, having no limiting character, as shown in the accompanying drawings wherein:

FIGS. 3A, 3B, 3C show a pivoting stirrup for the fixation of the device in a slanting position;

FIG. 4 is a profile view of the device, in a vertical position;

FIG. 5 is a transverse sectional view along line A—A of FIG. 1;

FIGS. 6A, 6B are respectively a side view and a view from above of the carrier; and FIGS. 7 and 8 show the device fitted out with an accessory for executing a rectilinear work of constant depth in a material which is not plane.

DETAILED DESCRIPTION OF THE INVENTION

Figure 1:
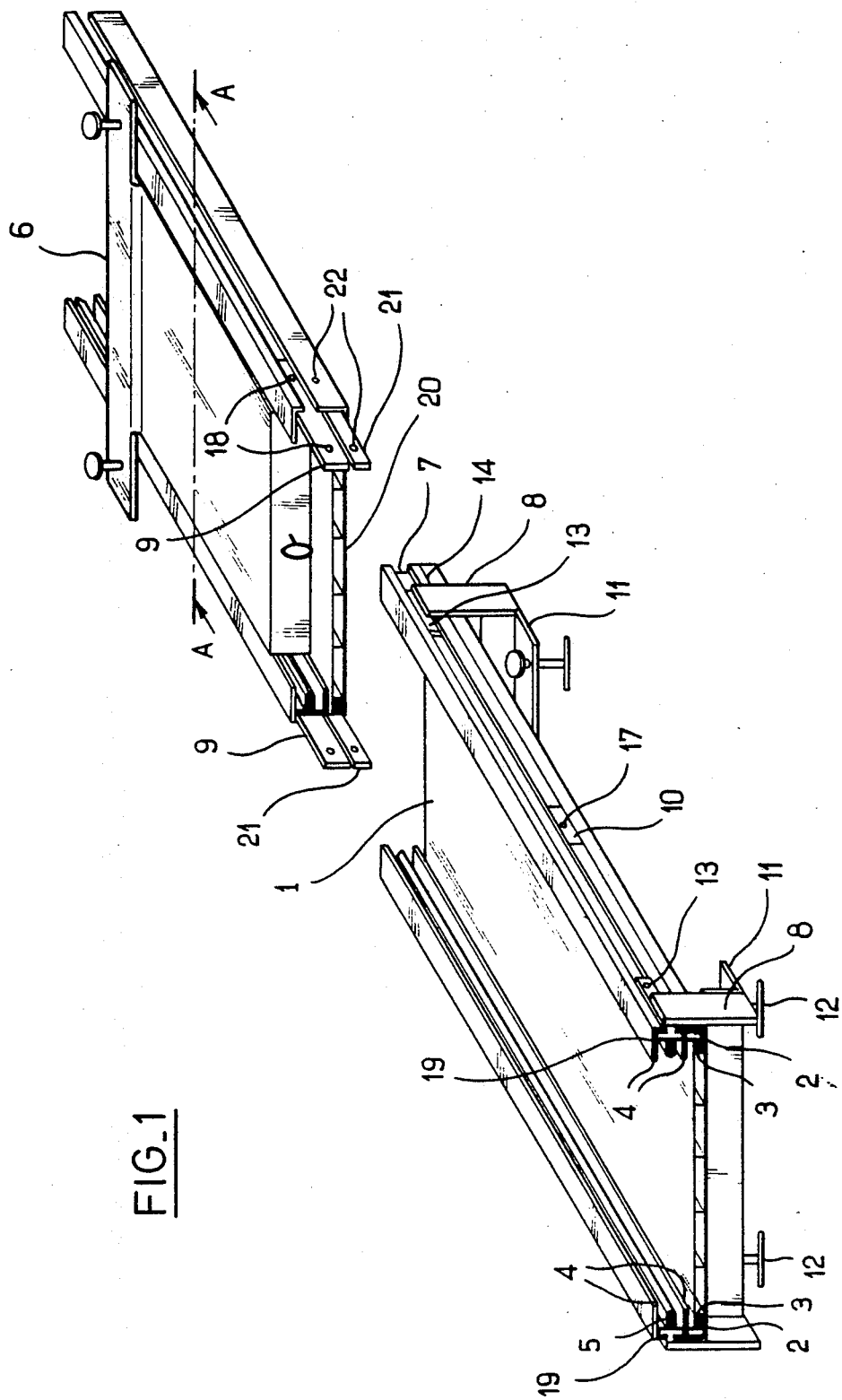
FIG. 1 is a perspective view of the whole device.

The device shown in the drawings is adapted for the mounting and guiding of a portable electric machine with a view to executing a work by a rectilinear displacement of the machine on a plate material which can be of large dimensions.

The device includes substantially one of several identical rails 1, 20, assembled end to end as a function of the size of the plate material; a carrier 6 which rolls on the rail and on which can be fixed the machine; fixation stirrups 8 of the rail of the plate material, and possible accessories for the manoeuvre and setting of the carrier stoke.

Each rail 1 is made of a rigid material and has a U-shaped configuration which is wide with respect to its height, including two wings 2 and a bottom 3, the latter serving as support face for the rail on the plate material. According to the invention, the wings and the bottom are double-walled, both walls being connected by braces or interconnection walls so as to form a light monolithic structure adapted for resisting without deformation to the efforts generated by the operation of the machine whatever its orientation in space.

As may be seen particularly in FIG. 5, the wings double wall and brace define together a longitudinal slide 7 which is accessible via a open slot formed in the outer wall. The slide is also opened at its ends. Thus, this slide can receive rail fixation stirrups, described hereafter, and accessories such as abutments 10 for setting the work length, pulleys for counter-weights, pulleys for pulling the carrier, etc. This allows an easy mounting and setting of these components, at the required position along the rail, with a blockage in position by means of screws 13, 17. Moreover, said components do not interfere with the entry and exit of the carrier.

At its ends, slide 7 can receive prolongators or fish-plates 9, locked by screws 22, allowing assembling rails 1, 9 end to end until the desired length is obtained. Thereby is provided a modular rail of larger length than that of the material to be worked, so that the carrier remains always maintained in the rail, even at the beginning and at the end of the work stroke, and one can easily clamp the stirrups on the material at the ends of said material.

One sees also in FIG. 5 that the wings double wall and brace define another housing 14 which may receive other fishplates 21. The rails are thus easily assembled to one another by four fishplates, so that the linearity and rigidity of the modular assembly are ensured.

Wings 2 include moreover a longitudinal flange oriented to the inside, parallel to the base of the U and extending up to the immediate vicinity of the carrier. This flange increases further the rail rigidity and prevents material scraps from falling on the carrier rollers.

Two parallel travelling paths 5, of a triangular profile in order to accommodate a possible play, are fixed inside the wings so as to receive the mobile carrier 6 via rollers 50 having a groove of corresponding profile. A small free space is reserved between the carrier underneath and the rail bottom for the passage of the carrier pulling cable.

One refers now to FIGS. 6A, 6B representing in a better way carrier 6 the body of which is constituted of a metal sheet 60 folded to the shape of a U and an upper plate 61 preventing the scraps from coming in contact with rollers 50. The latter, the number of which depends on the application in consideration and which may be six in number as shown, are mounted on axles 51 by means of roller bearing 67 spaced apart from the upper and lower plates by braces 64. The axles ends have right-hand and left-hand threads respectively, which are threaded inside tapped holes 62 formed in the plates, so that there is provided a structure of the carrier which is light in weight, rigid and of small thickness due to the absence of nuts. The position of axles 51 is such that the rollers are applied with an adequate pressure on the travelling paths. On the other hand, rings 31 are provided at each end of the carrier in order to eventually fix a pulling cable.

One also sees that carrier 6 has, in a plan view (6B) a T-shaped configuration including body 54, formed as hereabove described, and a cross-bar or head 52 rigid with the body but the plane of which is offset by a bayonet-shaped shoulder 53 a little above the plane of the upper plate 61, that is somewhat above the flange 4 of the rail wings. Cross-bar 52, which extends sidewise beyond wings 2 and carries accessories such as retractable abutments 55 used for setting the stroke, does not impede therefore the carrier movement. The advantage of this disposition is to reduce the space requirement since the largest portion of the carrier is inscribed inside the rail, to facilitate the insertion of the carrier in the rail as well as its extraction therefrom since the head can be used as a temporary support above the rail during these operations, and to obtain a general configuration with a minimum of protruding portions, thereby avoiding risks of wounds for the operator.

As regards the rail fixation stirrups, FIG. 1 shows stirrups 8 for a work which is perpendicular to the edge of the material plate. These stirrups slide via a base 19 in slides 7, inside which they are blocked by screws 19, and they are blocked on the material by screws 12.

The fixation stirrups 8 are mounted face to face, held each on either side of the rail, and the corner brackets 11 which are rigidly connected thereto are placed face to face toward the inside. The blockage in the work position is effected via screws 13 in the slides 7 of the rail and via screws 12 on the material to be worked. The stirrups may have any appropriate size, below the rail. All the other accessories mounted on the rail are provided so as to leave a free passage for the mobile carrier on the material.

Figure 2:
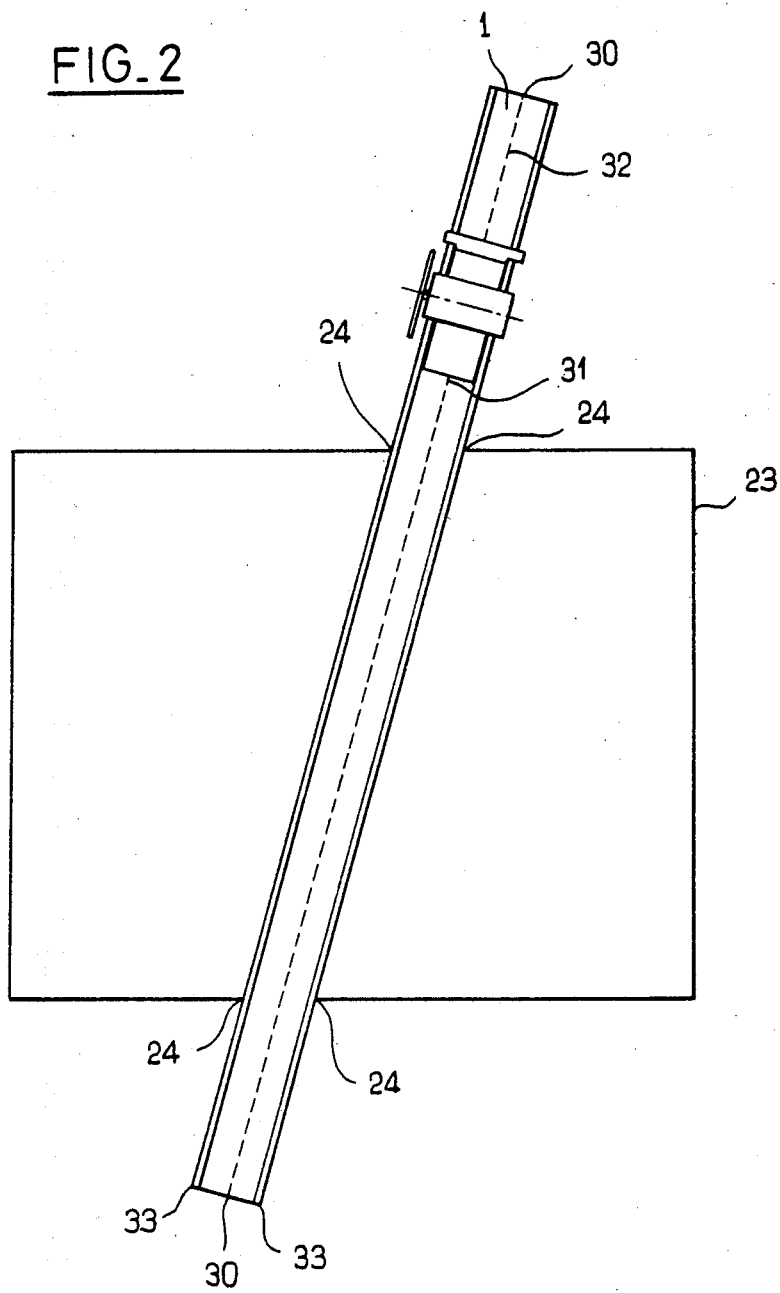
FIG. 2 is a view from above of the device in the working position.

Reference is now made to FIG. 2 showing rail 1 placed so as to form an angle with respect to the material 23 to be worked, and to FIGS. 3A, 3B, 3C representing fixation stirrups 24 of the sliding and pivoting type. These stirrups are mounted in the slides 7 by their bases 19' which can be displaced as a function of the desired angle and of the length, and which are blocked on the rail by screws 13'. A corner bracket 11 which is to be clamped on material 23 is fixed on a sleeve 27 having the diameter of the support rod 28, thereby allowing a rotation so as to obtain the required angle. The support rod is fixed on base 19' with a clearance 29 preventing it from touching the rail.

Pulleys 30, mounted at each end of rail 1, allow the circulation of the pulling cable 32 fixed to rings 31 provided to this effect on the mobile carrier 6, thereby allowing the operator to manually move the latter. When it is not possible to hold the apparatus due to the dimensions of the material to be worked, there is provided a remote control for achieving a total safety. Two end of stroke squares 33 are provided for avoiding the exit of carrier 6.

FIG. 4 shows a longitudinal rail 1 in a vertical position, fixed on a support plate 40 by settable fixation stirrups 8 at 90°. A wedge 41, having a thickness superior to that of the material to be worked, is placed between support 40 and rail 1 for allowing a free passage of the piece to be worked. This free passage is formed for avoiding dismounting rail 1 at each operation and it allows advancing the material over the required distance for obtaining a large throughput. On top of rail 1 are provided two pulleys 42 allowing a cable 43 fixed to a counterweight 44 and to carrier 6 to entrain the latter without any effort. Counterweight 44 balances the assembly formed by the carrier and the machine, for example a circular saw. At the bottom of rail 1 are provided two end of stroke squares 33.

The installation of the device according to the invention is described hereafter with reference to FIG. 2 and to a circular saw. The user first assembles, if necessary, several rail elements 1, which are easily transportable, in order to obtain the required total length, taking in account an entry and exit length, outside the material, which is superior to that of the carrier. Thereafter, he fixes the rail on the material to be cut, by using the orientable sliding stirrups 24 in the case of the slanting position of FIG. 2. Then he inserts the carrier in the travelling path, this operation being made easy by the T shape of the carrier. The latter is then guided without any clearance along a straight line on the travelling path 5, and the only thing to do is to pull the carrier. The protection member of the saw blade is retracted and the cut can be effected. When the cut is completed, the protection member resumes its initial position.

One sees that the device according to the invention allows a rectilinear work in all positions, over any length, and that it is easy to transport, to mount, to use and to dismount.

Figure 7:
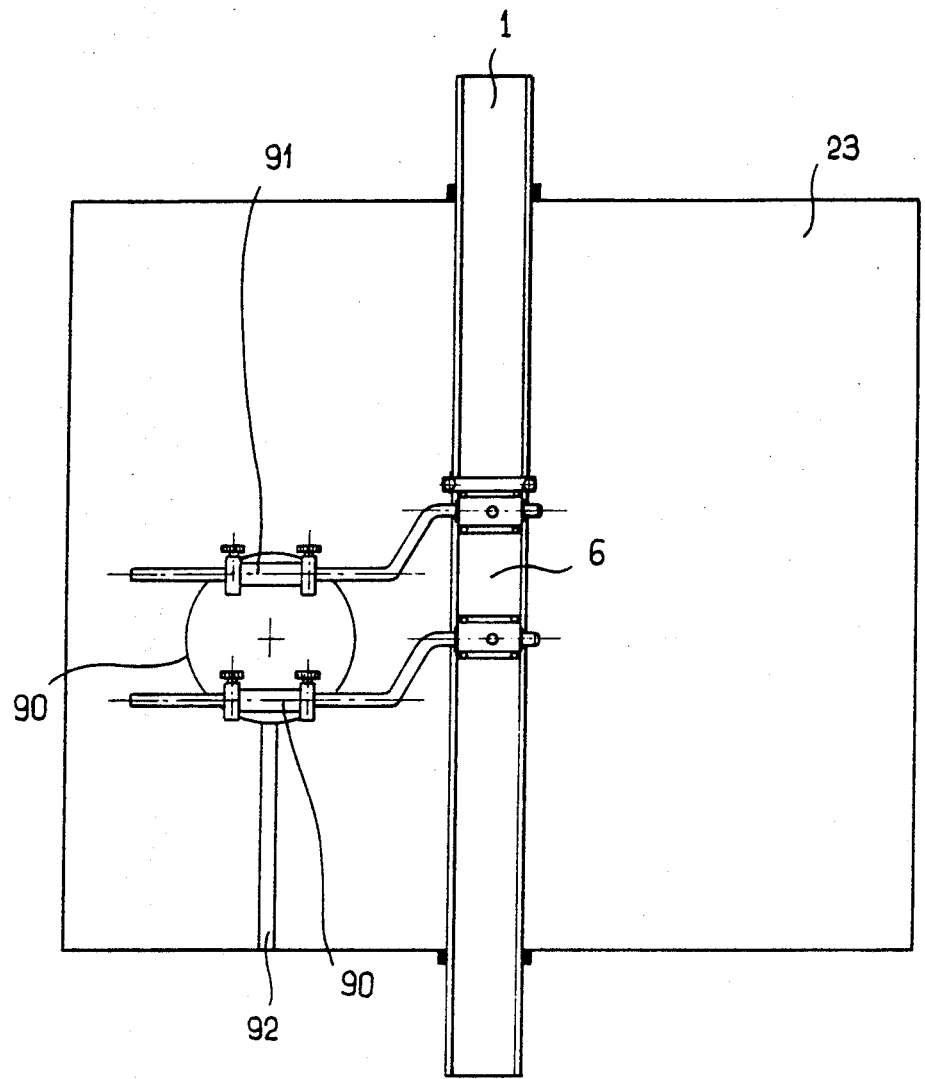

FIGS. 7 and 8 show a device provided with an accessory for effecting a work of constant depth, even when the material is warped, presents a curve or is of a particular configuration on its surface. This accessory includes a metal sheet 80 formed with holes 85 for its fixation to carrier 6. A sleeve 81 having a clamping screw 86 is fixed on this metal sheet 80. A round iron rod, including in its intermediate portion a double bayonet-shaped elbow 82, is introduced inside sleeve 81 and held in the latter by a circlip 84, so that the bayonet can rotate freely inside the sleeve, but without any possibility of a side displacement. At the bayonet other end, a sleeve 83 is set to the desired position for the work to be executed, then blocked by screw 87. The machine 90 is mounted on the bayonet by using the holes 91 formed in its sole, and then one puts in position another sleeve 88, clamped by screw 89 on rod 82. Thus, the machine can swivel freely without any lateral play. The device includes two identical members 82 mounted on carrier 6 with a distance between axes corresponding to the holes of the machine sole. The machine can then follow a surface which is not plane, the relative variations between the contact zone of machine 1 with that of the rail on the material being automatically compensated by a different angular position of the bayonets which rotate freely in their fixations. Of course, the offset between the parallel legs of the bayonet has to be adapted to the differences of level of the surface, so as to obtain a sufficient stroke of the machine, while maintaining the bayonet inclined with respect to the material, so that the reaction of the machine generates a pivoting movement of the bayonet.

Of course, detail modifications can be carried out as regards the shape and design of the device according to the invention without departing from its scope.

I claim:

1. A device for supporting and guiding portable electric machines executing a rectilinear work, such as a cut, a slot, a rabbet, which includes a rectilinear rail (1) of a U-shaped section including two parallel wings (2) and a bottom (3), in which a travelling path (5) receives a mobile carrier (6) adapted for carrying the machine, the rail being fixed on a material (23) to be worked by sliding stirrups (8, 24), in slides on said wings characterized in the rail is made, at least over a major portion of its perimeter, of a double wall, the two walls being rigidly connected to one another by braces placed in spaces between the two walls so as to form a monolithic structure, non deformable under the efforts generated by the machine in any position.

2. A device according to claim 1, characterized in that at least one of said braces extends inside the double wall wings (2) of the U-shaped section in the rail longitudinal direction so as to define, inner spaces, on the one hand said slide (7) formed with a slot opened in its outer wall for settable longitudinal mounting of the stirrups (8, 24) as well as setting (10) or manoeuvre (42) accessories of the machine, and on the other hand housings (7, 14) for prolongators or spindles (9, 21) adapted for the assembly end to end of successive rails (1, 20), said spindles being preferably four in number at each rail junction.

3. A device according to claim 1, characterized in that wings (2) of the U-shaped section include each at their end a flange (4) oriented toward the inside of the section and extending up to the vicinity of said carrier (6), parallel to the base of the U.

4. A device according to claim 1, characterized in that the travelling paths (5) have a triangular section and are fixed inside said wings (2), and rollers of said carrier having grooves formed with a corresponding profile, and rotate on axles (51) which are parallel to the wings and are screwed directly, theirs ends are provided with a right-hand and a left-hand thread respectively, in two parallel plates (60, 61) forming the carrier body.

5. A device according to claim 1, characterized in that the carrier has a T-shaped configuration having a transverse bar and leg, the leg of the T being formed by the body (54) of the carrier housed inside rail (1) and the transverse bar (52) of the T being in a plane parallel to the body plane but slightly offset above the rail and extending laterally beyond wings (2) in order to carry stroke setting abutments (55) or another accessory.

6. A device according to claim 1, characterized in that there are provided two prolongators or assembly spindles (9, 21) on each wing, in order to provide a perfect junction.

7. A device according to claim 1, characterized in that the stirrups (8) are provided for a fixation at 90° and are not orientable.

8. A device according to claim 1, characterized in that the fixation stirrups (24) on the rail include a base (19') which can slide in the slide (7) of the rail wing, an outer rod (28) offset and rigidly connected to said base and perpendicular to a bottom face (3) of the rail, a sleeve (27) which can be set angularly on said rod, and a clamping screw (25) carried by a square (11) rigidly connected to said sleeve.

9. A device according to claim 1, characterized in that two identical cylindrical rods are fixed at one end to carrier (6), parallel to the material and perpendicular to the rail, so that they can rotate freely (81) but without any possibility of an axial displacement (84), said rods being connected at their other end in the same way (83, 88) to the machine and including, in their intermediate portion which is outside the rail, a double bayonet-shaped elbow (82) the angular change of position of which allowing compensating relative variations between contact surfaces of the machine (90) and of the rail on the material.

* * * * *